(12) United States Patent
Borchardt

(10) Patent No.: US 7,413,102 B1
(45) Date of Patent: Aug. 19, 2008

(54) POURABLE COOKING RECEPTACLE SYSTEM

(76) Inventor: Scott G. Borchardt, 2008 Hwy. H, Edgar, WI (US) 54426

( * ) Notice: Subject to any disclaimer, the term of this patent is extended or adjusted under 35 U.S.C. 154(b) by 486 days.

(21) Appl. No.: 10/985,433

(22) Filed: Nov. 10, 2004

(51) Int. Cl.
  *A47J 27/00* (2006.01)
(52) U.S. Cl. .................. 222/166; 222/164; 248/133; 248/139; 414/419; 126/349; 366/220; 366/47; 99/407; 99/409
(58) Field of Classification Search ........... 222/164, 222/166, 167; 248/137, 139–142, 126, 130, 248/133; 99/407, 427, 409–415; 414/419–421, 414/403, 404; 126/349; 219/389; 366/36, 366/39, 45, 47, 48, 54, 185, 220, 239; 312/323
See application file for complete search history.

(56) References Cited

U.S. PATENT DOCUMENTS

| | | | | |
|---|---|---|---|---|
| 3,113,696 A | * | 12/1963 | Kubodera | .................... 220/765 |
| 3,388,804 A | * | 6/1968 | Hester | ........................ 210/470 |
| 4,173,925 A | | 11/1979 | Leon | ............................ 99/348 |
| 4,278,386 A | | 7/1981 | Eranosian | .................... 414/421 |
| 4,873,918 A | * | 10/1989 | Goldman | ..................... 99/403 |
| 5,626,073 A | * | 5/1997 | Bauer | .......................... 99/337 |
| 6,145,432 A | | 11/2000 | Bellue, Jr. | .................... 99/348 |
| 6,575,337 B1 | | 6/2003 | Malavear | .................... 222/166 |

FOREIGN PATENT DOCUMENTS

| | | | |
|---|---|---|---|
| DE | 296 22 467 | * | 2/1997 |
| JP | 8-299181 | * | 11/1996 |

* cited by examiner

*Primary Examiner*—J. Casimer Jacyna
(74) *Attorney, Agent, or Firm*—Westman, Champlin & Kelly, P.A.

(57) ABSTRACT

A pourable cooking receptacle construction (10) that includes an open framework member (20) having a base (21) and a pair of support arms (24) wherein, each support arm is provided with a mounting post (40) and a cooking pot member (30) having a pair of cylindrical collar members (50) connected on opposite sides of the cooking pot member (30) by axle elements (51) wherein, the collar members (50) are further provided with locking levers (54) that engage the mounting posts (40) so that the cooking pot member (30) can be raised and lowered relative to the mounting posts (40) and pivoted about the axle elements (51).

6 Claims, 3 Drawing Sheets

US 7,413,102 B1

POURABLE COOKING RECEPTACLE SYSTEM

CROSS REFERENCE TO RELATED APPLICATIONS

This invention was the subject matter of Disclosure Document Program Registration No. 526,360, which was filed in the U.S. Patent and Trademark Office on Feb. 20, 2003.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of pourable cooking receptacle arrangements in general and in particular to a system that allows the cooking receptacle to be raised, lowered, and pivoted relative to a support structure.

2. Description of Related Art

As can be seen by reference to the following U.S. Pat. Nos. 6,575,337; 4,278,386; 4,173,925, and 6,145,432, the prior art is replete with myriad and diverse pourable cooking receptacle arrangements.

While all of the aforementioned prior art constructions are more than adequate for the basic purpose and function for which they have been specifically designed, they are uniformly deficient with respect to their failure to provide a simple, efficient, and practical cooking pot construction that cooperates with a framework to selectively position the cooking pot on a heat source and then sequentially raise the cooking pot and then pivot the cooking pot to pour the contents of the pot onto a dish or serving bowl.

As many older and/or infirm individuals are all too well aware, due to physical limitations, the cooking and serving of food from large cooking receptacles is extremely difficult, if not physically impossible.

In addition, there are many institutional environments wherein, exceptionally large cooking pots are employed wherein, the shear size and volumetric weight of the pot and its contents present unique challenges to the individuals that are charged with the responsibility of distributing the contents of the pots.

As a consequence of the foregoing situation, there has existed a longstanding need among a selected segment of the population for a new and improved pourable cooking receptacle system that allows large cooking receptacles to be vertically displaceable within a framework and then subsequently pivoted relative to the framework to dispense the contents of the cooking receptacle, and the provision of such a construction is a stated objective of the present invention.

BRIEF SUMMARY OF THE INVENTION

Briefly stated, the pourable cooking receptacle system that forms the basis of the present invention comprises in general a framework unit, a cooking receptacle unit, and a mounting unit having components associated with both the framework unit and the cooking receptacle unit that allow the cooking receptacle unit to be raised, lowered, and pivoted relative to the framework unit.

As will be explained in greater detail further on in the specification, the framework unit comprises a framework member having an open rectangular shaped base wherein, two opposed sides of the base are provided with inverted U-shaped support arms.

The cooking receptacle unit comprises in general a cooking pot member having a spout and a handle diametrically disposed relative to one another and further provided with a lid having a centrally disposed lid handle wherein, an arcuate segment of the lid has been removed to provide an enlarged pour opening in conjunction with the spout of the cooking pot member.

In addition, the mounting unit comprises a pair of support post members wherein, each support post member is fixedly secured on top of one of the support arms of the framework member, and further comprises a pair of pivoting cylindrical bracket members that are connected to the opposed sides of the cooking pot member and further provided with locking levers that are selectively engageable with said support post members.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
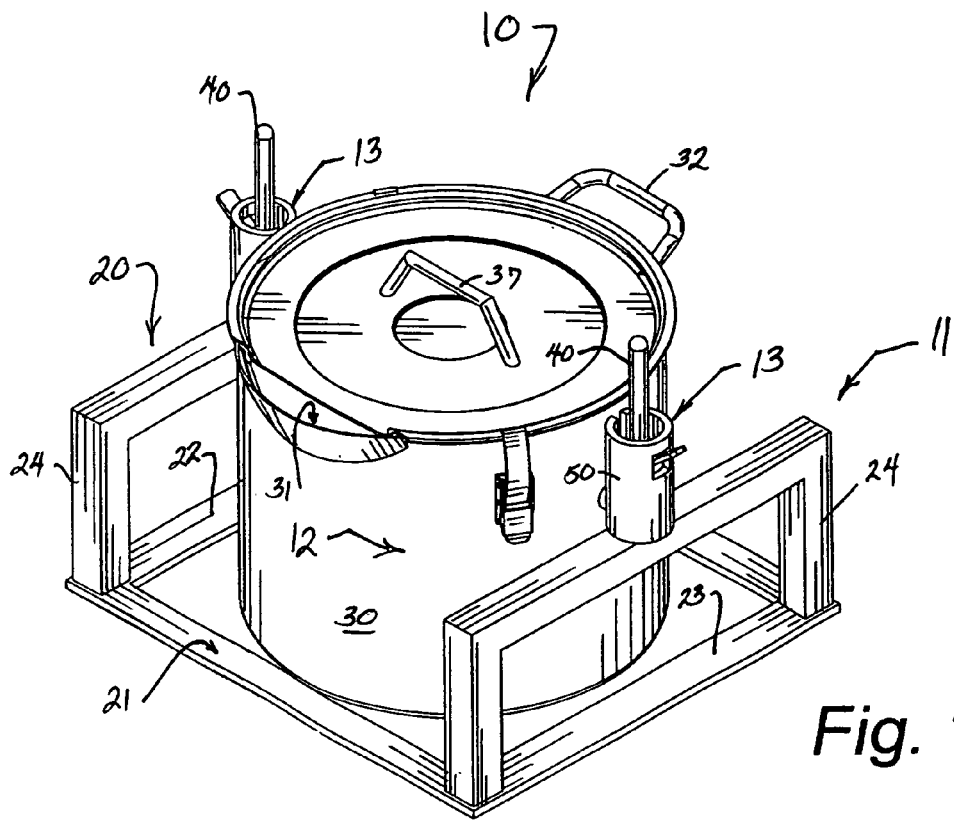
FIG. 1 is a perspective view of the pourable cooking receptacle system that forms the basis of the present invention.

As can be seen by reference to the drawings, and in particularly to FIG. 1, the pourable cooking receptacle system that forms the basis of the present invention is designated generally by the reference number 10. The system 10 comprises in general a framework unit 11, a cooking receptacle unit 12, and a mounting unit 13 having portions that are operatively connected to both the framework unit 11 and the cooking receptacle unit 12. These units will now be described in seriatim fashion.

As shown is FIGS. 1, 7, and 8, the framework unit 11 comprises a generally open framework member 20 having an open, generally flat rectangular base 21 having opposed sides 22 23 each provided with a generally inverted U-shaped support arm 24 the purpose and function of which will be described in greater detail further on in the specification.

Turning now to FIGS. 1 through 4, it can be seen that the cooking receptacle unit 12 comprises an enlarged cooking pot member 30 having a spout element 31 and a handle element 32 diametrically disposed on the upper portion of the cooking pot member 30 and further including a pair of offset diametrically opposed latching elements 33 the purpose and function of which will be described next.

As can also be appreciated by reference to FIGS. 1 through 4, the cooking receptacle unit 12 also includes a lid member 34 having a discontinuous raised lip 35 that is interrupted by an arcuate segment that has been removed from the lid member 34 to provide a pouring opening 36 that will be aligned with the pour spout 31 of the cooking pot member 30.

Figure 2:
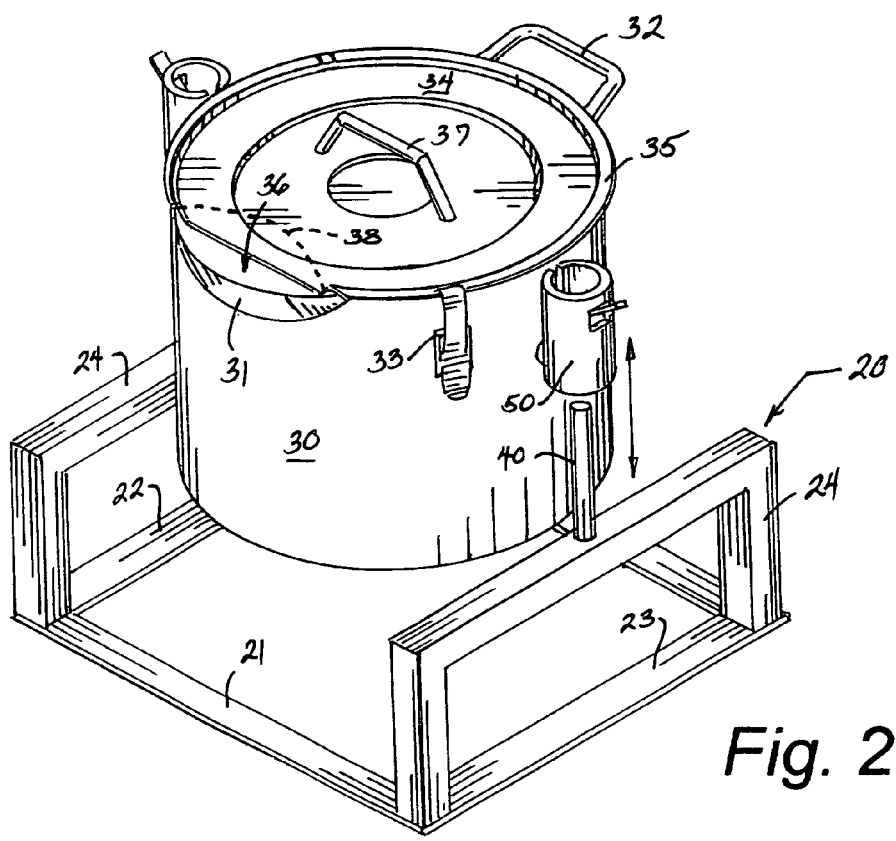
FIG. 2 is a partially exploded perspective view of the cooking receptacle system.
Figure 7:
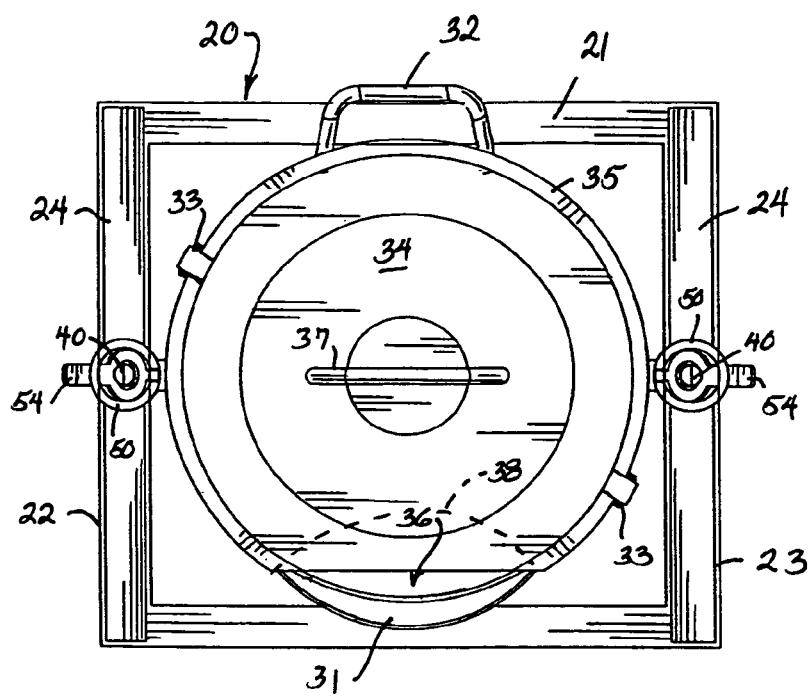
FIG. 7 is a top plan view of the cooking receptacle system.

In addition, the latching elements 33 are adapted to engage the raised lip 35 of the lid member 34 to securely fasten the lid member 34 to the pot member 30 in a well recognized fashion wherein, the lid member 34 is further provided with a lid handle 37 and an optional hinged lid panel 38 depicted in phantom in FIGS. 2 and 7, in order that the lid member 34 substantially seals the top of the cooking pot member 30 during cooking.

Figure 8:
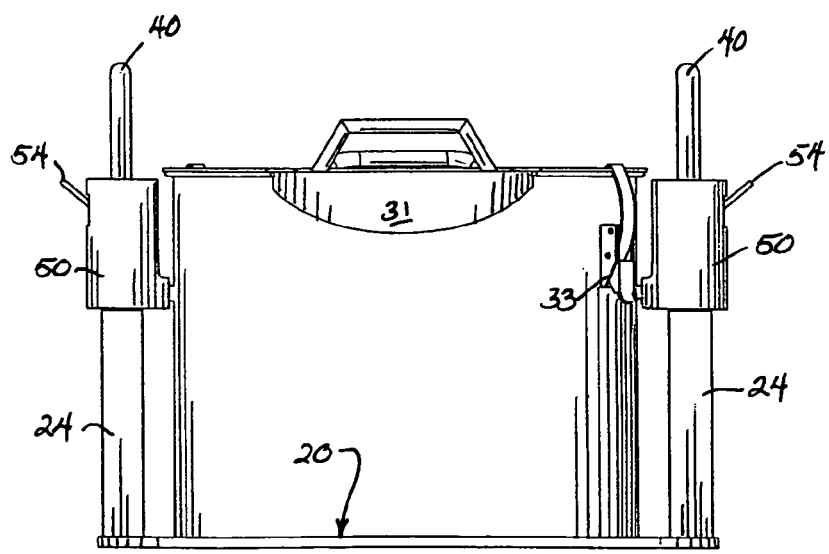
FIG. 8 is a front elevation view of the receptacle system with the cooking pot member lowered to its cooking position.

As can best be appreciated by reference to FIGS. 1, 7 and 8, the first component of the mounting unit 13 comprises a pair of mounting posts 40 40 wherein, each mounting post 40 is centrally disposed on and projects upwardly from one of the support arms 24 of the framework member 20.

Figure 5:
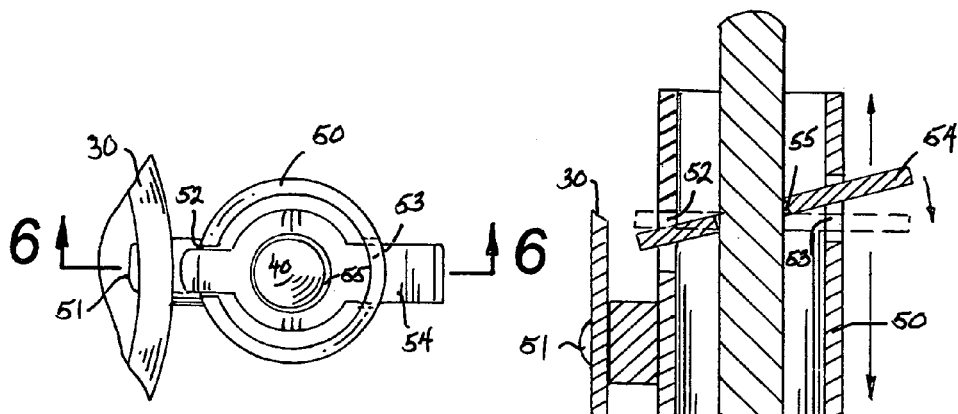
FIG. 5 is a top plan view showing one side of the locking unit.
Figure 6:
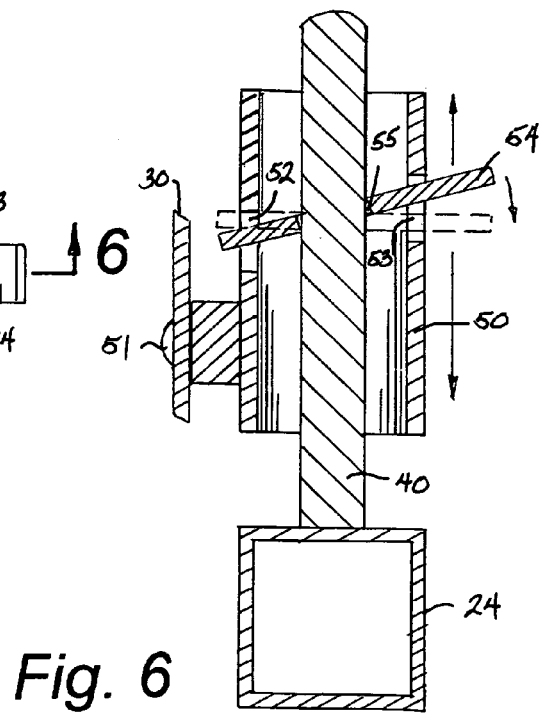
FIG. 6 is a cross sectional view taken through line 6-6 of FIG. 5.

Turning ow to FIGS. 5 through 7, it can be seen that the second component of the mounting unit 13 comprises a pair of cylindrical collar members 50 pivotally connected to the opposite sides of the cooking pot member 30 via axle elements 51 that are oriented perpendicular to the axial orientation of the handle element 32 and spout element 31 of the cooking pot member 30.

Figure 3:
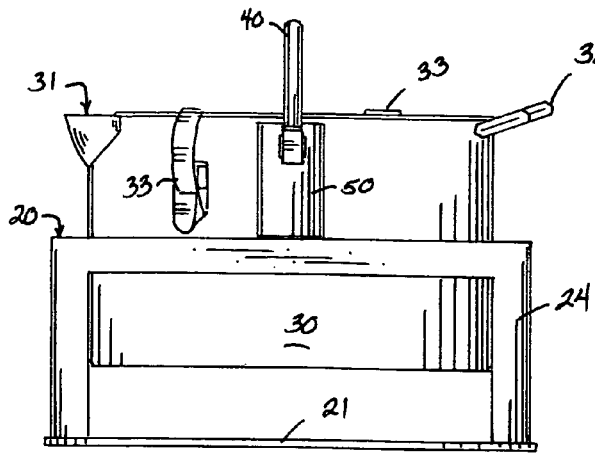
FIG. 3 is a side elevation view showing the cooking pot member in its raised position.

Furthermore, as can best appreciated by reference to FIGS. 5 and 6, each of the cylindrical collar members 50 is further provided with offset apertures 52 53 that are dimensioned to receive the opposite ends of a locking lever 54 having a central opening 55 the sides of which will frictionally engage the periphery of the mounting posts 40 to raise and lower the cooking pot member 30 relative to the framework member 20 as depicted in FIGS. 1, 3 and 8.

Figure 4:
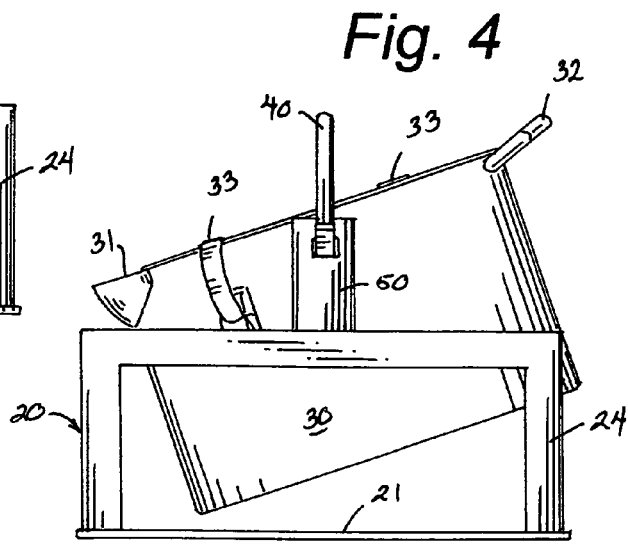
FIG. 4 is a side elevation view showing the cooking pot member in its pivoted position.

In addition, as shown, in FIGS. 3 and 4, once the cooking pot member 30 has been raised to a desired height relative to the framework member 20, the handle element 32 may be grasped to pivot the cooking pot member 30 about the axles 51 to pour the contents of the cooking pot member 30 through the spout 31 and the lid opening 36.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

The invention claimed is:

1. A pourable cooking receptacle system comprising:
    a framework unit including a generally open framework member having a generally rectangular base provided with a pair of support arms;
    a cooking receptacle unit including a cooking pot member and a pair of cylindrical collar members wherein each of the collars include a pair of offset apertures and a locking lever that is provided with a central aperture and wherein each of the collar members is pivotally connected to one side of the cooking pot member by an axle element; and
    a mounting unit including a pair of mounting posts wherein each one of the collar members are slidably positionable about each mounting post for vertically displacing and pivotally connecting the pot member to said pair of mountings posts by frictionally engaging sides of the central aperture with the periphery of the mounting posts.

2. The system as in claim 1; wherein, said cooking pot member has an upper portion provided with a diametrically opposed spout element and handle element which are aligned on an axis disposed perpendicular to the axis of said axle elements.

3. The system as in claim 2; wherein, the cooking receptacle unit further comprises:
    a lid member dimensioned to rest on top of said cooking pot member wherein, the lid member is provided with a raised rim.

4. The system as in claim 3; wherein, the cooking pot member is further provided with a pair of opposed latch elements adapted to engage the raised rim of said lid member.

5. The system as in claim 4; wherein, the raised rim of the lid member is discontinuous and the lid member is provided with a pouring opening.

6. The system as in claim 5; wherein, said lid member is further provided with a hinged lid panel that is adapted to cover said pouring opening.

\* \* \* \* \*